US 7,983,844 B2
Jul. 19, 2011

(12) United States Patent
Beach et al.

(10) Patent No.: US 7,983,844 B2
(45) Date of Patent: Jul. 19, 2011

(54) DEVICE AND METHOD FOR DETERMINING WIND CONDITIONS USING MULTIPLE WIND RESOURCE GRIDS

(75) Inventors: Kelsey Elizabeth Beach, Atlanta, GA (US); Karsten Hilt, Münster (DE); Vinicius Ubarana, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 12/642,316

(22) Filed: Dec. 18, 2009

(65) Prior Publication Data

US 2011/0137564 A1 Jun. 9, 2011

(51) Int. Cl.
*G01W 1/02* (2006.01)

(52) U.S. Cl. ............... 702/3; 702/1; 702/2; 73/170.11; 73/170.07; 73/170.16; 700/286; 700/287; 700/291; 290/44; 290/54; 290/55; 416/1; 416/31

(58) Field of Classification Search .............. 702/1, 2, 702/3; 73/170.11, 170.07, 170.16; 700/286, 700/287, 291; 290/2, 44, 43, 52, 53, 54, 290/55; 416/1, 31, 32, 37, 43, 44, 35, 39, 416/41
See application file for complete search history.

(56) References Cited

U.S. PATENT DOCUMENTS

| | | | | |
|---|---|---|---|---|
| 5,155,375 | A * | 10/1992 | Holley | 290/44 |
| 5,289,041 | A * | 2/1994 | Holley | 290/44 |
| 6,320,272 | B1 * | 11/2001 | Lading et al. | 290/44 |
| 6,801,856 | B2 * | 10/2004 | Ohba et al. | 702/3 |
| 7,013,203 | B2 * | 3/2006 | Moore et al. | 700/286 |
| 7,199,482 | B2 * | 4/2007 | Hopewell | 290/44 |
| 7,372,173 | B2 * | 5/2008 | Lutze et al. | 290/44 |
| 7,504,738 | B2 * | 3/2009 | Barton et al. | 290/44 |
| 7,523,001 | B2 * | 4/2009 | Morjaria et al. | 702/3 |
| 2006/0273595 | A1 * | 12/2006 | Avagliano et al. | 290/44 |
| 2007/0001461 | A1 * | 1/2007 | Hopewell | 290/44 |
| 2007/0047163 | A1 * | 3/2007 | Lutze et al. | 361/78 |
| 2007/0069522 | A1 * | 3/2007 | Barton et al. | 290/44 |
| 2007/0183885 | A1 * | 8/2007 | Ormel et al. | 415/4.1 |
| 2008/0079263 | A1 * | 4/2008 | Morjaria et al. | 290/44 |
| 2008/0174180 | A1 * | 7/2008 | Jurkat et al. | 307/80 |
| 2008/0228553 | A1 * | 9/2008 | Bryson et al. | 705/10 |
| 2009/0027002 | A1 * | 1/2009 | Stahlkopf | 320/101 |
| 2009/0096211 | A1 * | 4/2009 | Stiesdal | 290/44 |

(Continued)

OTHER PUBLICATIONS

Unknown, "Resource, Wind Resource Map," Wind Pro 2, Dec. 2005, pp. 41-42, EMD International A/S, Aalborg, Denmark.

(Continued)

*Primary Examiner* — Carol S Tsai
(74) *Attorney, Agent, or Firm* — James McGinness, Esq.; Armstrong Teasdale LLP

(57) ABSTRACT

A method for determining wind conditions within a geographic area based on a plurality of input wind resource grids. The input wind resource grids include input points associated with a geographic position and a wind condition. An output wind resource grid having a plurality of output points is defined. Each output point is associated with a geographic position within the geographic area. For each output point in the output wind resource grid, a wind condition is calculated based at least in part on wind conditions associated with at least some of the input points. A wind condition associated with an input point may be weighted based on the proximity of the output point to a meteorological instrument associated with the input point.

20 Claims, 15 Drawing Sheets

U.S. PATENT DOCUMENTS

2009/0177333 A1* 7/2009 Delmerico et al. ........... 700/297
2010/0076613 A1* 3/2010 Imes ............................. 700/287
2010/0133848 A1* 6/2010 Piasecki ......................... 290/55
2010/0198420 A1* 8/2010 Rettger et al. ................ 700/291
2010/0305916 A1* 12/2010 Takahashi et al. ................ 703/2
2010/0313650 A1* 12/2010 Esteban Cornejo ....... 73/170.11
2011/0004356 A1* 1/2011 Garcia ......................... 700/287

OTHER PUBLICATIONS

Unknown, "GH WindFarmer, Software Training Courses," Jan. 2007, 4 pages, Garrad Hassan Group, UK.

* cited by examiner

US 7,983,844 B2

DEVICE AND METHOD FOR DETERMINING WIND CONDITIONS USING MULTIPLE WIND RESOURCE GRIDS

BACKGROUND OF THE INVENTION

The subject matter described herein relates generally to wind farm planning and, more particularly, to creating a single wind resource grid based on multiple wind resource grids.

A wind farm or "site" includes one or more wind turbines, which utilize wind energy to generate or produce electrical power. Prior to installing wind turbines in a wind farm, meteorological conditions, such as wind speed, may be monitored using one or more meteorological instruments. Wind turbines are installed according to the meteorological conditions to optimize wind farm operation.

At least some known systems produce a wind resource grid based on signals from a meteorological instrument. For example, a wind resource grid may indicate wind conditions within a geographic area. In some cases, such as a relatively large or geographically complex site, multiple wind resource grids may be created. Theoretically, more accurate results may be obtained using multiple data sets. However, interpreting wind conditions across a site based on multiple wind resource grids can be difficult. Furthermore, a simple method of combining wind resource grids, such as strict averaging, may produce inaccurate results, including abrupt changes in values near wind resource grid boundaries.

BRIEF DESCRIPTION OF THE INVENTION

In one aspect, a device for determining wind conditions within a geographic area is provided. The device includes a memory area configured to store a plurality of input wind resource grids. The input wind resource grids include a plurality of input points. Each input point is associated with a wind condition, a first geographic position, and a meteorological instrument having a second geographic position. At least one input point of the plurality of input points is associated with a first geographic position within the geographic area. The device also includes a processor coupled to the memory area. The processor is programmed to define an output wind resource grid having a plurality of output points associated with a third geographic position within the geographic area. The processor is also programmed to, for each output point of the plurality of output points of the output wind resource grid, determine a wind condition. A wind condition is determined based at least in part on a wind condition associated with at least one corresponding input point and a distance between the third geographic position of the output point and the second geographic position of a meteorological instrument associated with the at least one corresponding input point.

In another aspect, a method for determining wind conditions within a geographic area is provided. The method includes acquiring a plurality of input wind resource grids. The input wind resource grids include a plurality of input points associated with a first geographic position and a wind condition. The first geographic position of at least one of the input points is within the geographic area. An output wind resource grid having a plurality of output points is defined. The output points are associated with a second geographic position within the geographic area. For each output point of the plurality of output points of the output wind resource grid, a wind condition is calculated by a processor based at least in part on a plurality of wind conditions associated with at least some of the acquired plurality of input points.

DETAILED DESCRIPTION OF THE INVENTION

Figure 1:
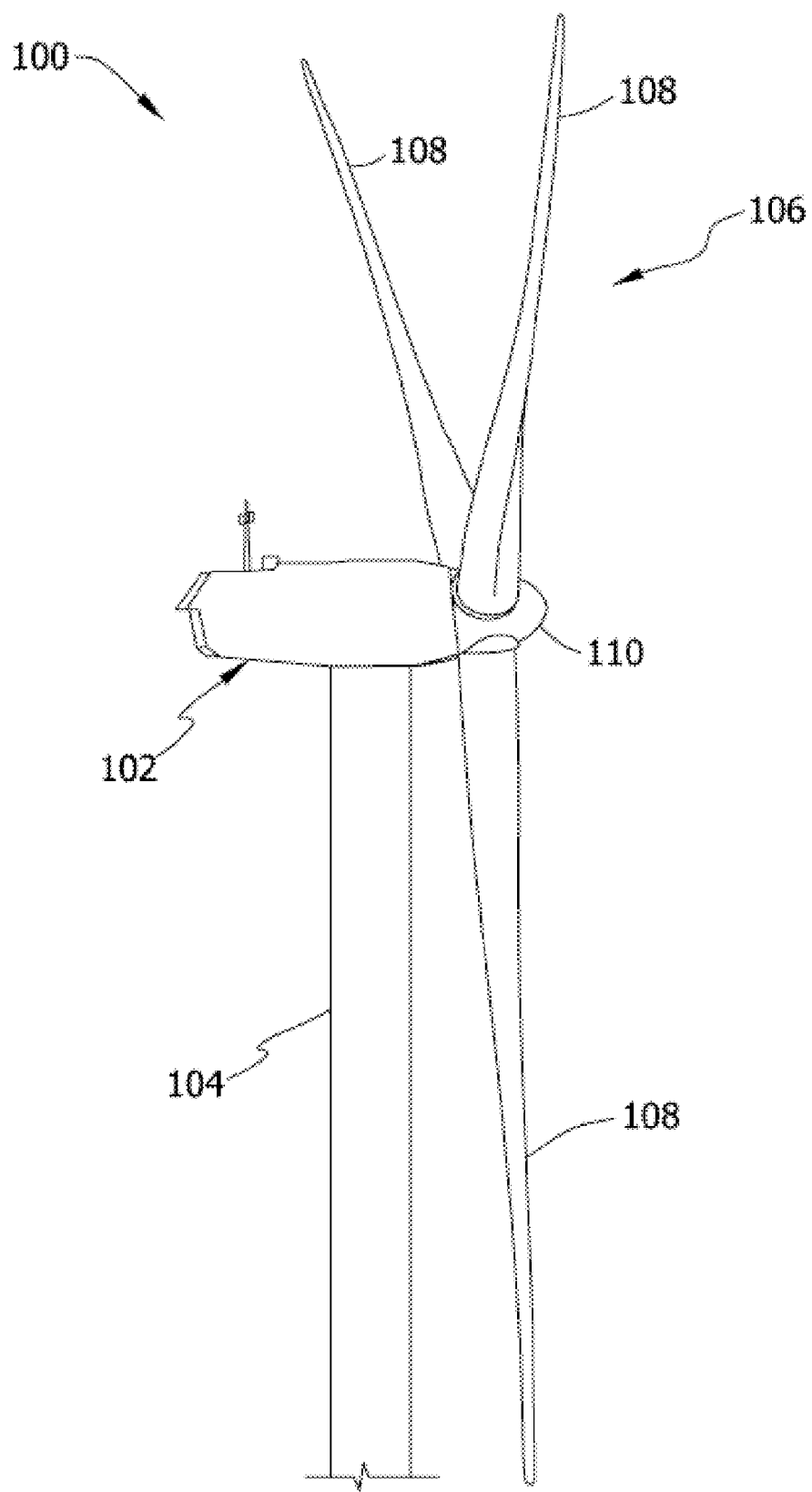
FIG. 1 is a perspective view of an exemplary wind turbine.

The embodiments described herein facilitate merging multiple wind resource grids into a single wind resource grid for use in wind farm planning. The embodiments further facilitate merging wind resource grids using a distance-based weighting scheme in which the weight assigned to a wind condition associated with an input point varies based on the proximity of the input point to a meteorological instrument that produced the wind condition.

The term "wind condition" is used herein to include, without limitation, a wind speed, a frequency of occurrence of wind, a power density, a power production, and/or any metric indicating an actual, estimated, averaged, and/or potential capacity for electrical power generation at a particular position. A power density may indicate power production relative to a disc area of a wind turbine rotor. For example, the disc area of a rotor may be equal to pi ($\pi$) multiplied by the square of the distance between the center point of the rotor and the tip of a rotor blade. In some embodiments, a plurality of angular sectors, extending from a geographic position and collectively forming a circle, is associated with a geographic position. For example, twelve angular sectors may be defined, each thirty degrees wide. At least one wind condition is provided for each angular sector.

A wind condition is created based on at least one signal from a meteorological instrument. The meteorological instrument may include, without limitation, one or more sensors, such as one or more anemometers. The meteorological instrument may be positioned on a meteorological mast, positioned on a meteorological tower, and/or included with a wind turbine. In some embodiments, a wind condition is calculated based on one or more sensor signals. For example, an average wind speed may be calculated based on sensor signals over a period of months.

In some embodiments, raw wind data are created based on sensor signals from a meteorological instrument that is associated with a position. The raw wind data are then processed (e.g., summarized) to create a wind resource grid. In some cases, due to storage constraints or other considerations, the raw wind data are discarded after production of the wind resource grid.

A wind resource grid describes wind conditions at a plurality of positions (e.g., represented by grid points) within a geographic area. The position of the meteorological instrument and positions within the geographic area may include, for example, a latitude, a longitude, and/or an elevation. Latitude, longitude, and/or elevation may be expressed absolutely or relative to a reference point, such as a boundary of the geographic area, another position, sea level, and/or ground level.

An exemplary technical effect of the methods, system, and apparatus described herein includes at least one of: (a) acquiring a plurality of input wind resource grids including a plurality of input points associated with a geographic position and a wind condition; (b) defining an output wind resource grid having a plurality of output points associated with a geographic position within the geographic area; and (c) for each output point of the output wind resource grid, calculating a wind condition based at least in part on a plurality of wind conditions associated with a plurality of input points.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In an exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein.

Figure 2:
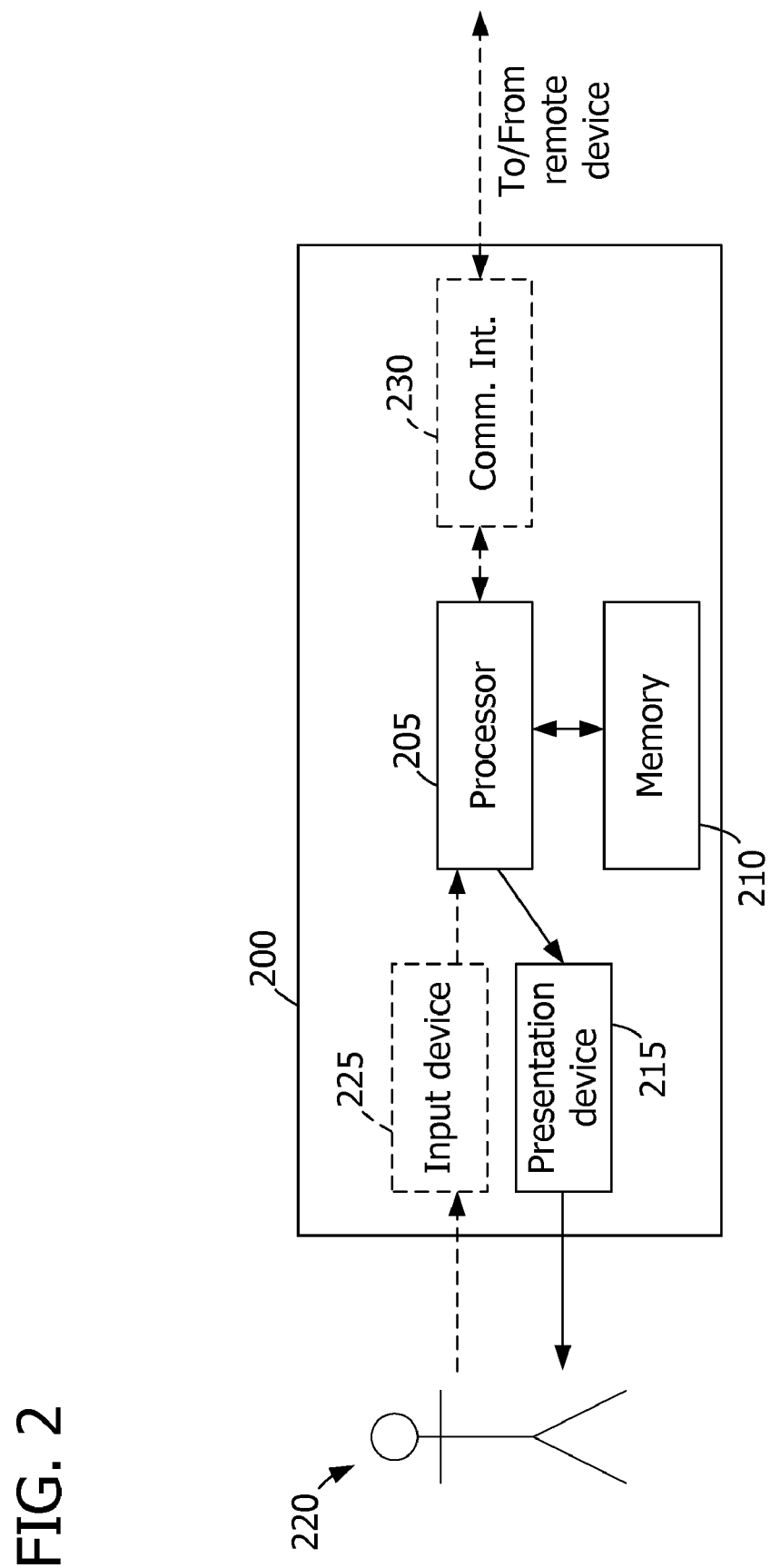
FIG. 2 is a block diagram showing an exemplary computing device for determining wind conditions within a geographic area.

FIG. 2 is a block diagram of an exemplary computing device 200 for determining wind conditions within a geographic area. Computing device 200 includes a processor 205 for executing instructions. In some embodiments, executable instructions are stored in a memory area 210, which is coupled to processor 205. Processor 205 may include one or more processing units (e.g., in a multi-core configuration). Memory area 210 is any device by which information, such as executable instructions and/or other data, may be stored and retrieved by processor 205.

Computing device 200 also includes at least one presentation device 215 for presenting information to a user 220. Presentation device 215 is coupled to processor 205 and is any component capable of conveying information to user 220. Presentation device 215 may include, without limitation, a display device (e.g., a liquid crystal display (LCD), organic light emitting diode (OLED) display, or "electronic ink" display), a printer, and/or an audio output device (e.g., a speaker or headphones). In some embodiments, presentation device 215 includes an output adapter, such as a video adapter and/or an audio adapter. An output adapter is operatively coupled to processor 205 and configured to be operatively coupled to an output device, such as a display device, a printer, and/or an audio output device.

In some embodiments, computing device 200 includes an input device 225 for receiving input from user 220. Input device 225 is coupled to processor 205 and may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 215 and input device 225. Computing device 200 may also include, coupled to processor 205, a communication interface 230, which is configured to be communicatively coupled to a remote device, such as another computing device (e.g., a server).

Stored in memory area 210 are, for example, computer readable instructions for providing a user interface to user 220 via presentation device 215 and, optionally, receiving and processing input from input device 225. A user interface may include, among other possibilities, a web browser and/or a client application. Web browsers and client applications enable users, such as user 220, to display and interact with media and other information from computing device 200 and/or a remote device. In addition, or in the alternative, a user interface may include a wind resource analysis application and/or a wind farm planning application.

In an exemplary embodiment, computing device 200 is provided for determining wind conditions within a geographic area. Memory area 210 is configured to store a plurality of input wind resource grids. Each input wind resource grid includes a plurality of input points. Each input point is associated with a wind condition, a geographic position, and a meteorological instrument having a geographic position. For example, a wind resource grid may include regularly spaced input points in a Cartesian coordinate system. At least a portion of the input points is associated with a geographic position within the geographic area.

Processor 205 is programmed to define an output wind resource grid having a plurality of output points associated with a geographic position within the geographic area. In some embodiments, processor 205 is programmed to receive a selection of the geographic area and/or a selection of input wind resource grids from input device 225. For example, presentation device 215 may display a map, and user 220 may use input device 225 to select a portion of the map as the geographic area. In one embodiment, processor 205 is programmed to identify one or more input wind resource grids based on the selected geographic area. For example, processor 205 may identify input wind resource grids having at least one input point associated with a geographic position within the geographic area.

In some embodiments, processor 205 is programmed to calculate wind conditions for an output wind resource grid according to one of a plurality of calculation methods (e.g., nearest meteorological instrument or linear inverse distance weighting), described in more detail below. Input device 225 is configured to receive a selection of a calculation method from user 220, and processor 205 is programmed to calculate wind conditions using the selected calculation method.

Figure 3:
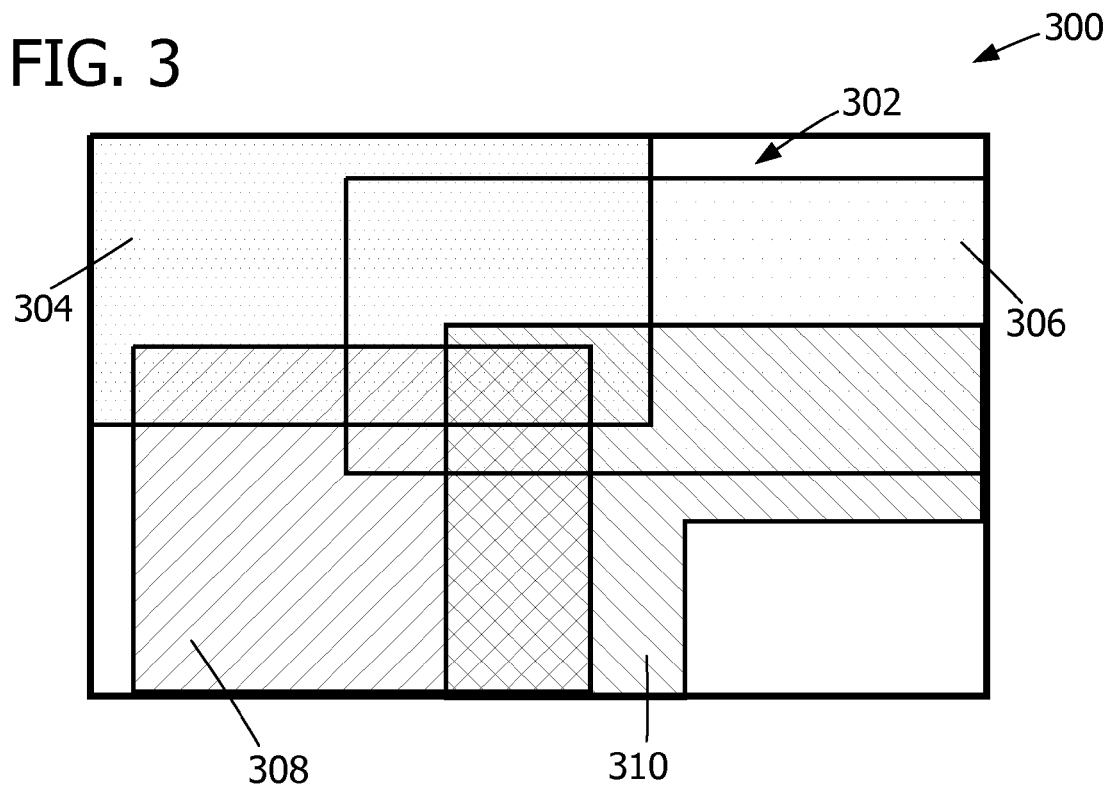
FIG. 3 shows an exemplary output wind resource grid including a geographic area corresponding to a plurality of input wind resource grids.
Figure 4:
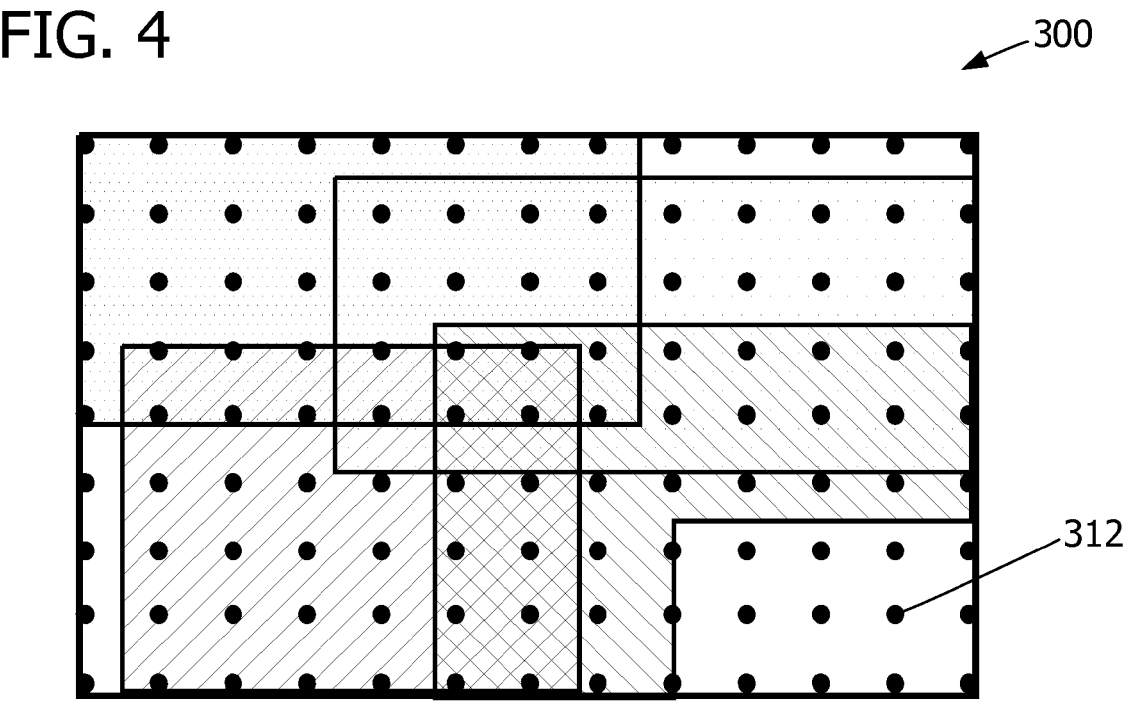
FIG. 4 shows the output wind resource grid shown in FIG. 3 with a plurality of output points.

FIG. 3 shows an exemplary output wind resource grid 300 including a geographic area 302 corresponding to a plurality of input wind resource grids. As shown in FIG. 3, geographic area 302 corresponds to a first input wind resource grid 304, a second input wind resource grid 306, a third input wind resource grid 308, and a fourth input wind resource grid 310. FIG. 4 shows output wind resource grid 300 with a plurality of output points 312.

For each output point 312 of output wind resource grid 300, processor 205 is programmed to determine a wind condition based at least in part on a wind condition associated with an input point and a distance between the output point and a meteorological instrument associated with the input point. For example, processor 205 may identify one or more meteorological instruments nearest to output point 312 and determine the wind condition of output point 312 based on the wind conditions of the input points associated with the identified meteorological instruments.

Processor 205 may calculate a wind condition for output point 312 based on multiple input values. In one embodiment, processor 205 is programmed to identify a plurality of input points associated with a geographic position substantially equal to the geographic position associated with output point 312. In FIG. 4, each input point has a geographic position identical to an output point 312. Input points are thus obscured by output points 312.

For each of the identified input points, processor 205 is programmed to assign a weight to the wind condition associated with the input point based on a proximity of the output point to the meteorological instrument associated with the input point. Processor 205 is further programmed to combine the wind conditions of the identified input points based on the assigned weights. In some embodiments, processor 205 is programmed to assign a weight to a wind condition further based on a confidence value associated with the corresponding meteorological instrument. For example, user 220 may define, via input device 225, a relatively high confidence value for a meteorological instrument believed to produce reliable data. Confidence values may be stored in memory area 210.

Figure 5:
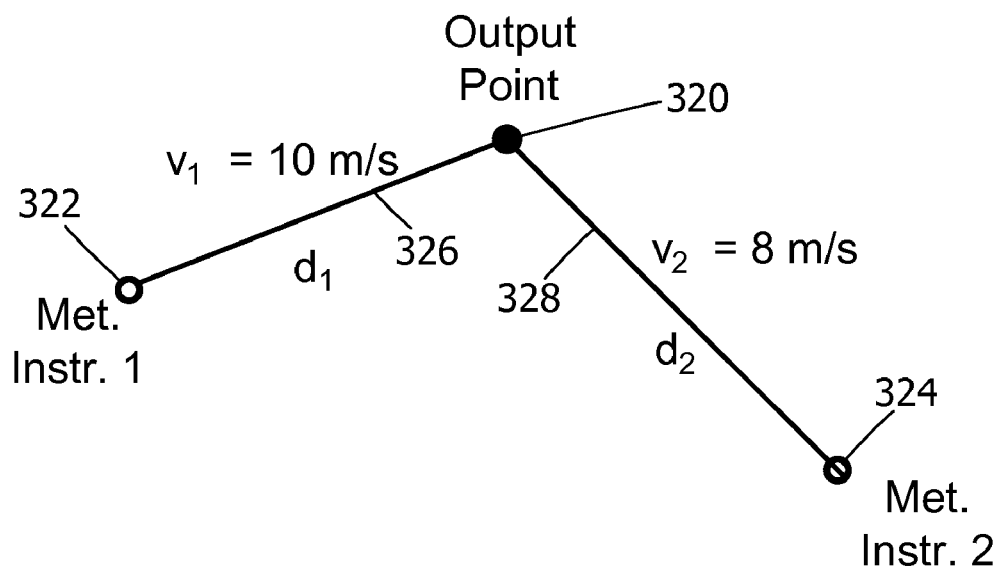
FIG. 5 shows an output point and two meteorological instruments in the output wind resource grid shown in FIG. 4.

FIG. 5 shows an output point 320, a first meteorological instrument 322, and a second meteorological instrument 324. For example, first meteorological instrument 322 and second meteorological instrument 324 may correspond to first input wind resource grid 304 and second input wind resource grid 306, respectively. The proximity of output point 320 to first meteorological instrument 322 or second meteorological instrument 324 may be determined in a variety of ways. In one embodiment, an identified plurality of input points includes a first input point and a second input point (obscured by output point 320 in FIG. 5) corresponding to first meteorological instrument 322 and second meteorological instrument 324, respectively. As shown in FIG. 5, the first input point is associated with a wind condition including a wind speed of 10 meters per second (m/s), and the second input point is associated with a wind condition including a wind speed of 8 m/s.

To determine the proximity of output point 320 to first meteorological instrument 322, processor 205 is programmed to determine a first distance 326 between output point 320 and first meteorological instrument 322, determine a second distance 328 between output point 320 and second meteorological instrument 324, and calculate a proximity based on first distance 326 and second distance 328. For example, processor 205 may be programmed to apply a linear or nonlinear inverse distance weighting function to first distance 326 and second distance 328. Such an embodiment facilitates calculating a relative distance for each input point and weighting the wind condition associated with each input point based on the relative distance.

Provided below are exemplary inverse distance weighing functions, which include terms as defined in Table 1.

TABLE 1

| Term | Definition |
|---|---|
| $V_1$ | Value of wind condition for first input point |
| $d_1$ | Distance between first input point and associated meteorological instrument |
| $V_2$ | Value of wind condition for second input point |
| $d_2$ | Distance between second input point and associated meteorological instrument |
| $V_3$ | Value of wind condition for third input point |
| $d_3$ | Distance between third input point and associated meteorological instrument |
| $V$ | Value of wind condition for output point |

Equation 1 below is an exemplary linear inverse distance weighting function.

$$v = \frac{d_2}{d_1 + d_2} v_1 + \frac{d_1}{d_1 + d_2} v_2 \qquad \text{(Eq. 1)}$$

Equation 2 below is an exemplary nonlinear inverse distance weighting function.

$$v = \frac{\frac{1}{d_1^2}}{\frac{1}{d_1^2} + \frac{1}{d_2^2}} v_1 + \frac{\frac{1}{d_2^2}}{\frac{1}{d_1^2} + \frac{1}{d_2^2}} v_2 \qquad \text{(Eq. 2)}$$

Equations 1 and 2 are exemplary functions for assigning weights to two wind conditions for an output point. In the example shown in FIG. 5, if first distance 326 and second distance 328 are equal, the mean of the wind conditions of the first input point and the second input point (i.e., 9 m/s) may be assigned as the wind condition for output point 320. If first distance 326 is less than second distance 328, the wind condition associated with the first input point (i.e., 10 m/s) receives a higher weight, and the wind condition calculated for output point 320 will be between the mean and the wind condition corresponding to first distance 326 (i.e., between 9 m/s and 10 m/s). As first distance 326 approaches zero, the wind condition calculated for output point 320 approaches the wind condition corresponding to first distance 326 (i.e., 10 m/s). In other words, as first distance 326 approaches zero, the weight or "influence" of first meteorological instrument 322 approaches 100%, and the influence of second meteorological instrument 324 approaches 0%.

Figure 6:
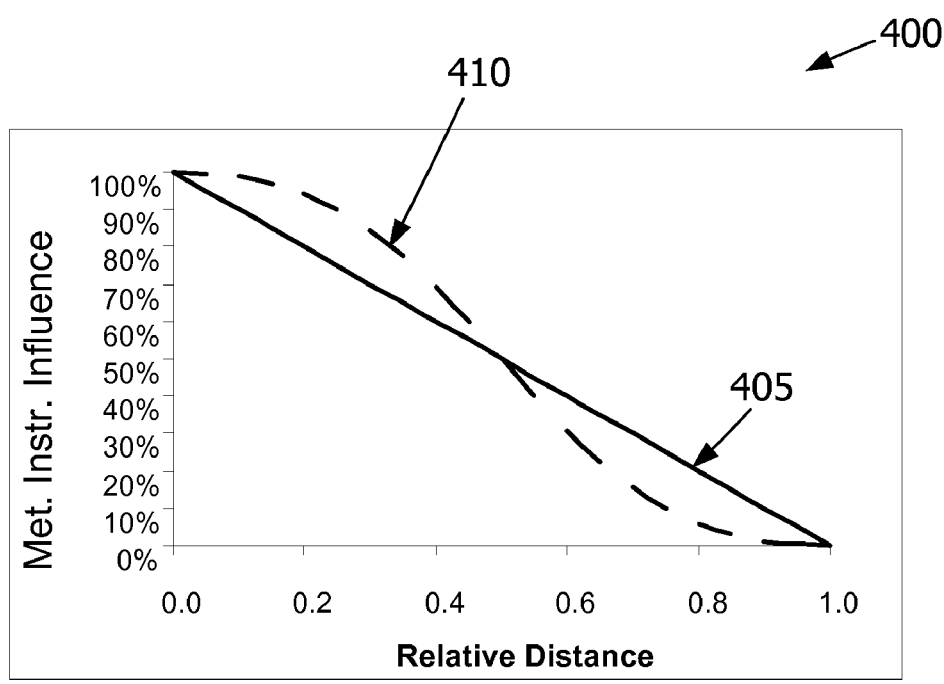
FIG. 6 is an exemplary graph of the relationship between relative distance and influence for a meteorological instrument.

FIG. 6 is an exemplary graph 400 of the relationship between relative distance and influence for a meteorological instrument. Graph 400 includes a first line 405 showing influence according to a linear inverse distance weighting function, such as set forth in Equation 1. Graph 400 also includes a second line 410 showing influence according to a nonlinear inverse distance weighting function, such as set forth in Equation 2.

Figure 7:
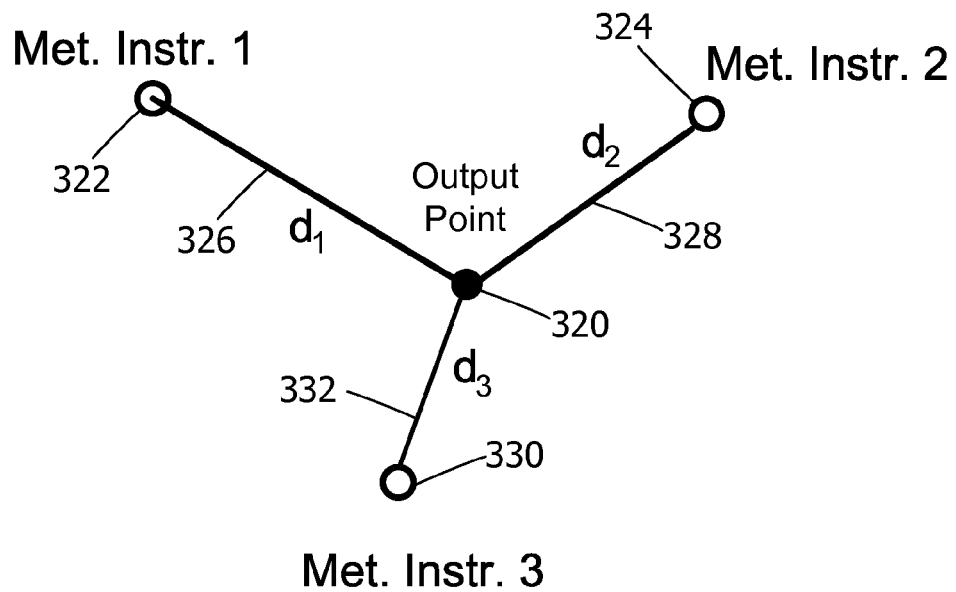
FIG. 7 shows an output point and three meteorological instruments in the output wind resource grid shown in FIG. 4.

If more than two input wind resource grids are provided, processor 205 may be programmed to assign weights to three or more wind conditions for output point 320. FIG. 7 shows output point 320, first meteorological instrument 322, second meteorological instrument 324, and a third meteorological instrument 330, which is associated with a third input point (obscured by output point 320 in FIG. 7). In one embodiment, processor 205 is programmed to determine the proximity of output point 320 to first meteorological instrument 322 by determining first distance 326, determining second distance 328, determining a third distance 332 between output point 320 and third meteorological instrument 330, and calculating a proximity based on first distance 326, second distance 328, and third distance 332. As described herein, processor 205 may be programmed to apply a linear or nonlinear inverse distance weighting function to first distance 326, second distance 328, and third distance 332.

Equation 3 is an exemplary inverse distance weighting function for weighting wind conditions associated with a plurality of input points.

$$v = \sum_{k=1}^{N} \left\{ \frac{1}{d_k^m} v_k \bigg/ \sum_{j=1}^{N} \frac{1}{d_j^n} \right\} \qquad \text{(Eq. 3)}$$

In Equation 3, N equals the quantity of input wind resource grids, such that each of k and j iterate over the input wind resource grids. For n=1, Equation 3 defines a linear inverse distance weighting function. For n>1, Equation 3 defines a nonlinear inverse distance weighting function.

Examples provided above describe assigning weights to wind conditions of two or three input points. However, the methods and functions described may be applied to any number of input points.

Figure 8:
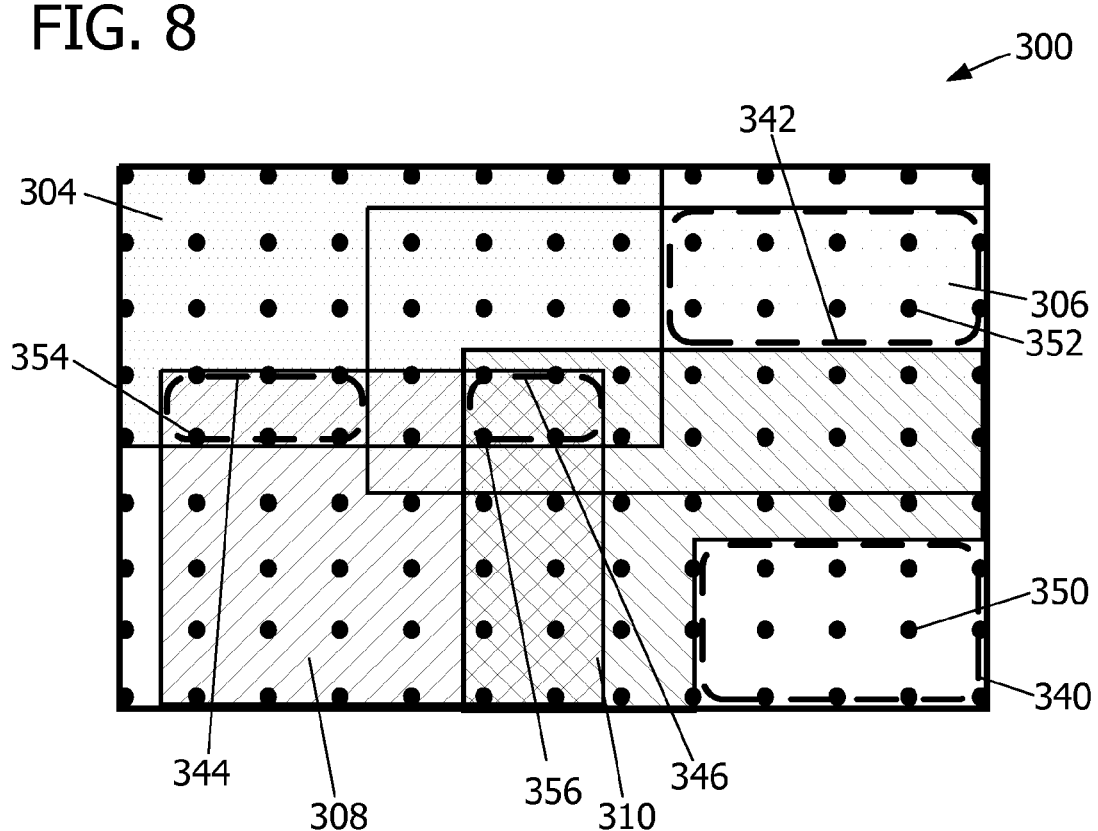
FIG. 8 shows portions of the output wind resource grid shown in FIG. 4 corresponding to different quantities of input wind resource grids.

FIG. 8 shows portions of output wind resource grid 300 corresponding to different quantities of input wind resource grids. In an exemplary embodiment, the quantity of input points for a given output point 312 is equal to the quantity of input wind resource grids corresponding to and/or including output point 312. Output wind resource grid 300 includes a first portion 340 included in no input wind resource grid, a second portion 342 included in one input wind resource grid (i.e., second input wind resource grid 306), a third portion 344 included in two input wind resource grids (i.e., first input wind resource grid 304 and third input wind resource grid 308), and a fourth portion 346 included in three input wind resource grids (i.e., first input wind resource grid 304, second input wind resource grid 306, third input wind resource grid 308, and fourth input wind resource grid 310).

In an exemplary embodiment, output points 350 within first portion 340 are associated with no wind condition. Wind conditions for output points 352 within second portion 342 are equal to wind conditions of corresponding input points from second input wind resource grid 306. Wind conditions for output points 354 within third portion 344 are calculated based on input points from first input wind resource grid 304 and third input wind resource grid 308. Wind conditions for output points 356 within fourth portion 346 are calculated based on input points from first input wind resource grid 304, second input wind resource grid 306, third input wind resource grid 308, and fourth input wind resource grid 310. In an alternative embodiment, at most three input wind resource grids are used to calculate a wind condition for output point 312. For example, the input wind resource grids corresponding to the three meteorological instruments nearest to output point 312 may be used.

In some embodiments, computing device 200 is configured to restrict the influence of input points associated with a meteorological instrument and/or an input wind resource grid to an area of influence. For example, for each output point, processor 205 may be programmed to identify one or more meteorological instruments associated with an area of influence that contains the output point and to calculate a wind condition for the output point based on input values corresponding to the identified meteorological instruments. An area of influence may be defined manually by user 220 or automatically by processor 205.

In some embodiments, input device 225 is configured to receive a selection of an area of influence for an input wind resource grid. The area of influence includes a portion of the geographic area of the input wind resource grid and/or the output wind resource grid. For example, the area of influence may include one or more polygons. Processor 205 is programmed to calculate wind conditions based on wind conditions corresponding to the input wind resource grid only for input points within the area of influence.

Figure 9:
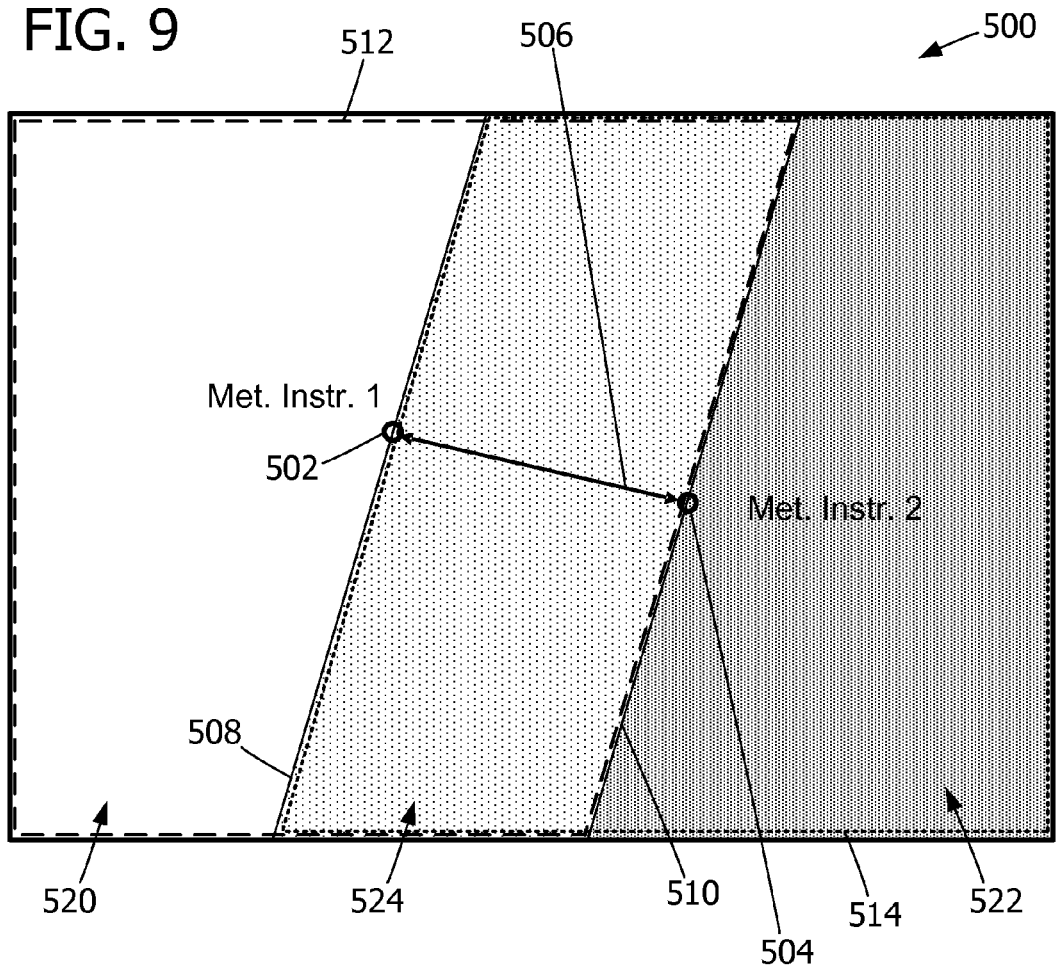
FIG. 9 shows an exemplary output wind resource grid including two meteorological instruments.

FIG. 9 shows an exemplary output wind resource grid 500 including a first meteorological instrument 502 and a second meteorological instrument 504. A first line 506 is drawn between first meteorological instrument 502 and second meteorological instrument 504. A second line 508 extends through first meteorological instrument 502 and perpendicular to first line 506. A third line 510 extends through second meteorological instrument 504 and perpendicular to first line 506. Second line 508 at least partially defines a first area of influence 512 corresponding to first meteorological instrument 502. Third line 510 at least partially defines a second area of influence 514 corresponding to second meteorological instrument 504. With areas of influence 512, 514 defined, output wind resource grid 500 includes a first portion 520 in which wind conditions are calculated based only on input points associated with first meteorological instrument 502, a second portion 522 in which wind conditions are calculated based only on input points associated with second meteorological instrument 504, and a third portion 524 in which wind conditions are calculated based on input points associated with first meteorological instrument 502 and input points associated with second meteorological instrument 504. Output wind resource grid 500 may be divided into first portion 520, second portion 522, and third portion 524, as described above, by user 220. In addition, or alternatively, processor 205 may be programmed to divide output wind resource grid 500 into first portion 520, second portion 522, and third portion 524.

Figure 10:
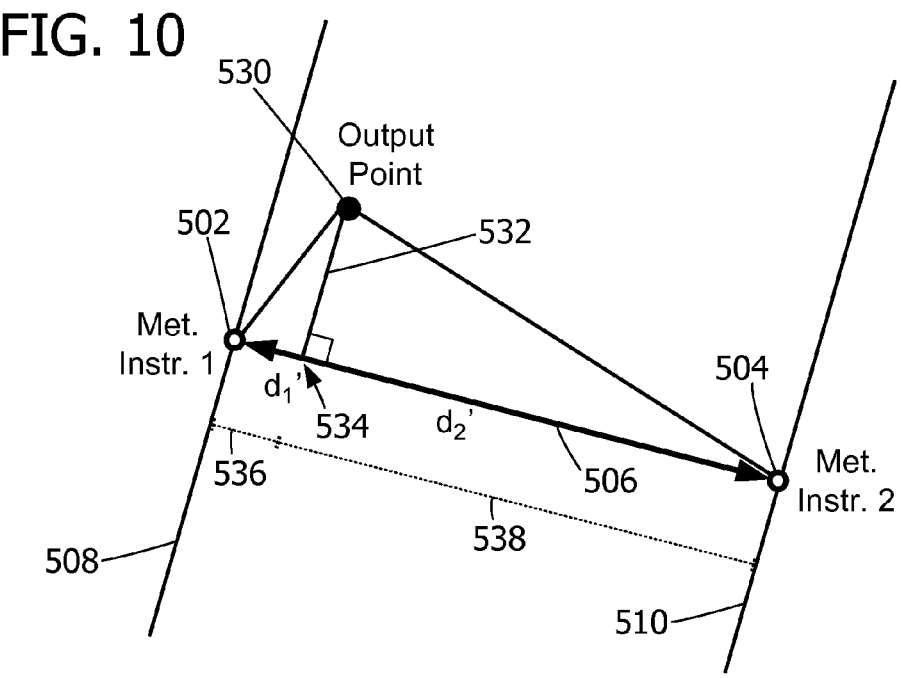
FIG. 10 shows projected distances for calculating relative distances from an output point to two meteorological instruments.

Some embodiments facilitate preventing abrupt changes in calculated wind conditions along boundaries between areas of influence. FIG. 10 shows projected distances for calculating relative distances from an output point 530 to first meteorological instrument 502 and second meteorological instrument 504 in output wind resource grid 500 (shown in FIG. 9). As shown in FIG. 10, output point 530 is offset from first line 506. A fourth line 532, extending from output point 530 and perpendicular to first line 506, is drawn to create an intersection point 534. A first distance 536 between intersection point 534 and first meteorological instrument 502, and a second distance 538 between intersection point 534 and second meteorological instrument 504 are determined. The proximity of output point 530 to first meteorological instrument 502 is calculated based on first distance 536 and second distance 538. Likewise, the proximity of output point 530 to second meteorological instrument 504 may also be calculated based on first distance 536 and second distance 538. For example, an inverse weighting function, such as set forth in Equations 1 and 2, may be applied to first distance 536 and second distance 538. Such an embodiment facilitates reducing the influence of second meteorological instrument 504 to 0% as output point 530 approaches third line 510, regardless of how far output point 530 is offset from first line 506.

Figure 11:
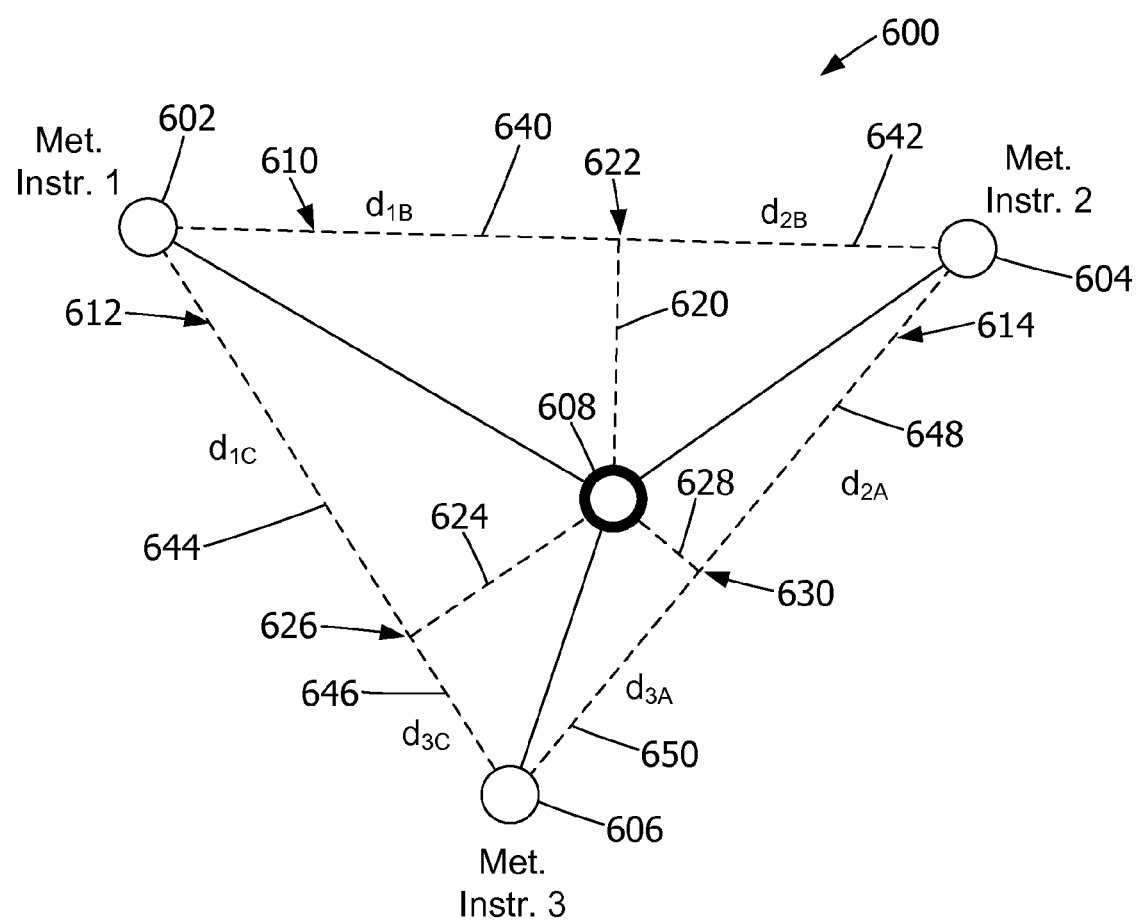
FIG. 11 shows projected distances in an output wind resource grid corresponding to three meteorological instruments.

FIG. 11 shows projected distances in an output wind resource grid 600 corresponding to a first meteorological instrument 602, a second meteorological instrument 604, and a third meteorological instrument 606 in an output wind resource grid 600. Projected distances are used to calculate relative distances from an output point 608 to first meteorological instrument 602, second meteorological instrument 604, and third meteorological instrument 606. A first line 610 is drawn between first meteorological instrument 602 and second meteorological instrument 604. A second line 612 is drawn between first meteorological instrument 602 and third meteorological instrument 606. A third line 614 is drawn between second meteorological instrument 604 and third meteorological instrument 606.

A fourth line 620, extending from output point 608 and perpendicular to first line 610, is drawn to create a first intersection point 622. A fifth line 624, extending from output point 608 and perpendicular to second line 612, is drawn to create a second intersection point 626. A sixth line 628, extending from output point 608 and perpendicular to third line 614, is drawn to create a third intersection 630. As shown in FIG. 11, each meteorological instrument is connected to each other meteorological instrument by a line that is perpendicularly intersected by another line extending from output point 608.

A first distance 640 (shown as $d_{1B}$) between first intersection point 622 and first meteorological instrument 602, and a second distance 642 ($d_{2B}$) between first intersection point 622 and second meteorological instrument 604 are determined. A third distance 644 ($d_{1C}$) is determined between second intersection point 626 and first meteorological instrument 602. A fourth distance 646 ($d_{3C}$) is determined between second intersection point 626 and third meteorological instrument 606. Similarly, a fifth distance 648 ($d_{2A}$) is determined between third intersection 630 and second meteorological instrument 604, and a sixth distance 650 ($d_{3A}$) is determined between third intersection 630 and third meteorological instrument 606.

The proximity of output point 608 to first meteorological instrument 602, second meteorological instrument 604, and/or third meteorological instrument 606 is calculated based on first distance 640, second distance 642, third distance 644, fourth distance 646, fifth distance 648, and sixth distance 650. For example, an inverse weighting function, such as set forth in Equation 3, may be applied to the distances. In one embodiment, Equation 4 below is applied.

$$v = \frac{1}{3}\left\{\left[\left(\frac{d_2}{d_1+d_2}\right)_A + \left(\frac{d_3}{d_1+d_3}\right)_C\right]v_1 + \left[\left(\frac{d_1}{d_1+d_2}\right)_B + \left(\frac{d_3}{d_2+d_3}\right)_A\right]v_2 + \left[\left(\frac{d_1}{d_1+d_3}\right)_C + \left(\frac{d_2}{d_2+d_3}\right)_B\right]v_3\right\} \quad \text{(Eq. 4)}$$

In one embodiment, user input device 225 is also configured to receive a user-defined weight corresponding to the area of influence. Processor 205 is programmed to calculate a wind condition for an output point within the area of influence based further on the user-defined weight. For example, user 220 may define a relatively high weight for an area of influence corresponding to a meteorological instrument believed to be more reliable than one or more other meteorological instruments.

Figure 12:
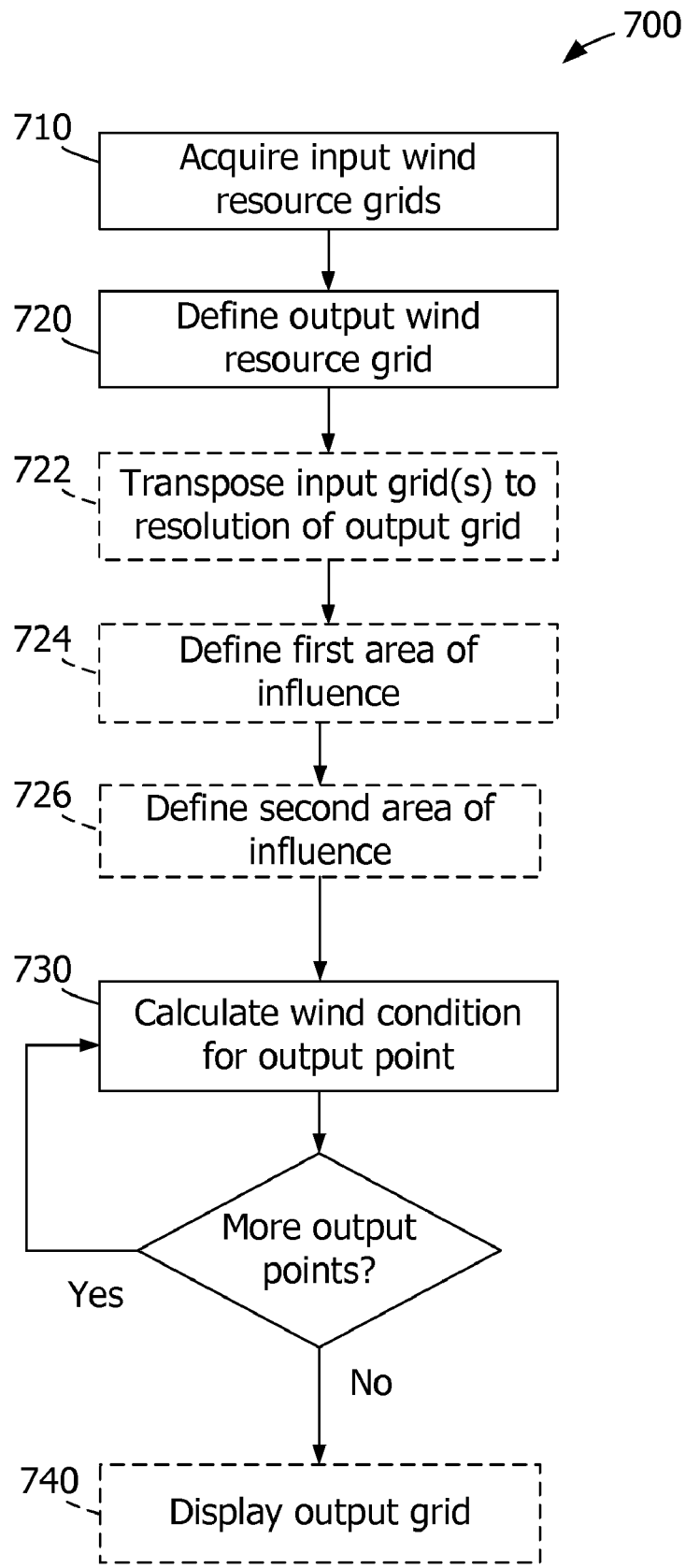
FIG. 12 is a flowchart of an exemplary method for determining wind conditions within a geographic area.

FIG. 12 is a flowchart of an exemplary method 700 for determining wind conditions within a geographic area. Method 700 includes acquiring 710 a plurality of input wind resource grids including a plurality of input points associated with a geographic position and a wind condition. At least some of the input points are associated with a geographic position within the geographic area. An output wind resource grid having a plurality of output points is defined 720. The output points are associated with a geographic position within the geographic area. For each output point of the output wind resource grid, a wind condition is calculated 730 by a processor based at least in part on a plurality of wind conditions associated with a plurality of input points. For example, a wind speed, a frequency of occurrence for at least one wind direction, a power density, and/or a power production may be calculated 730. The output wind resource grid may be displayed 740 using a presentation device.

Figure 13:
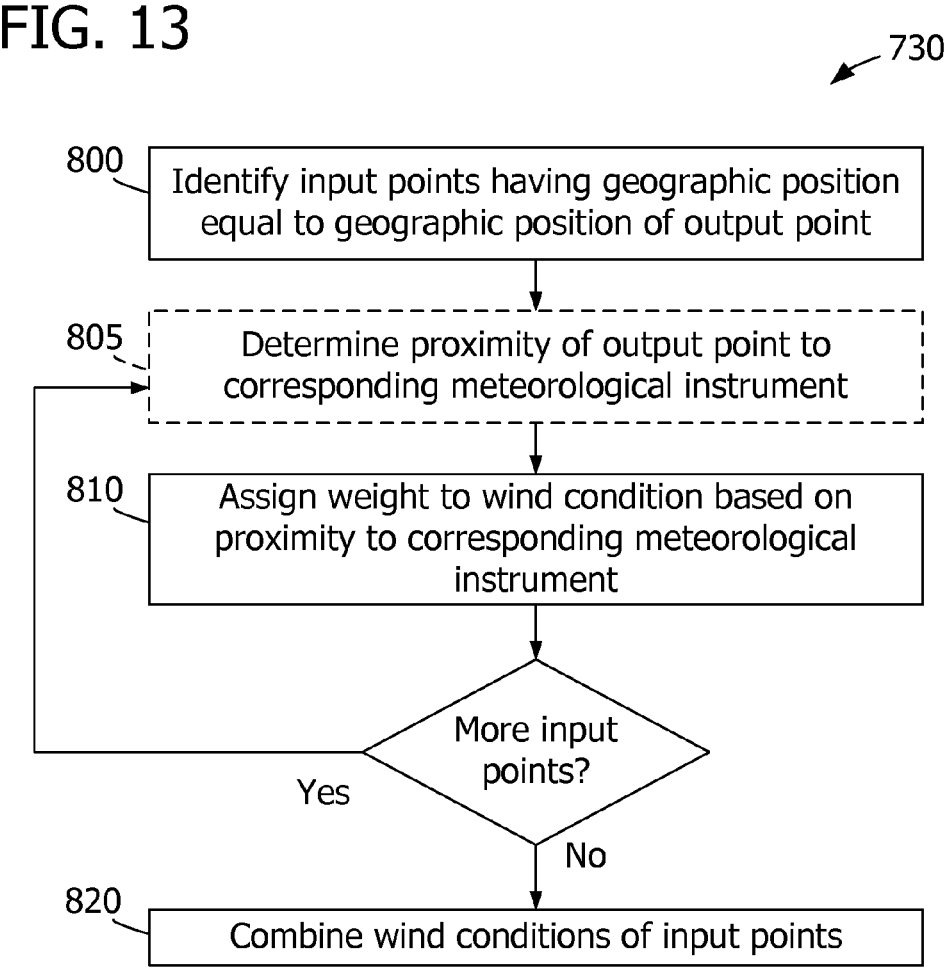
FIG. 13 is a flowchart of an exemplary method for calculating a wind condition for an output point of a wind resource grid.
Figure 14:
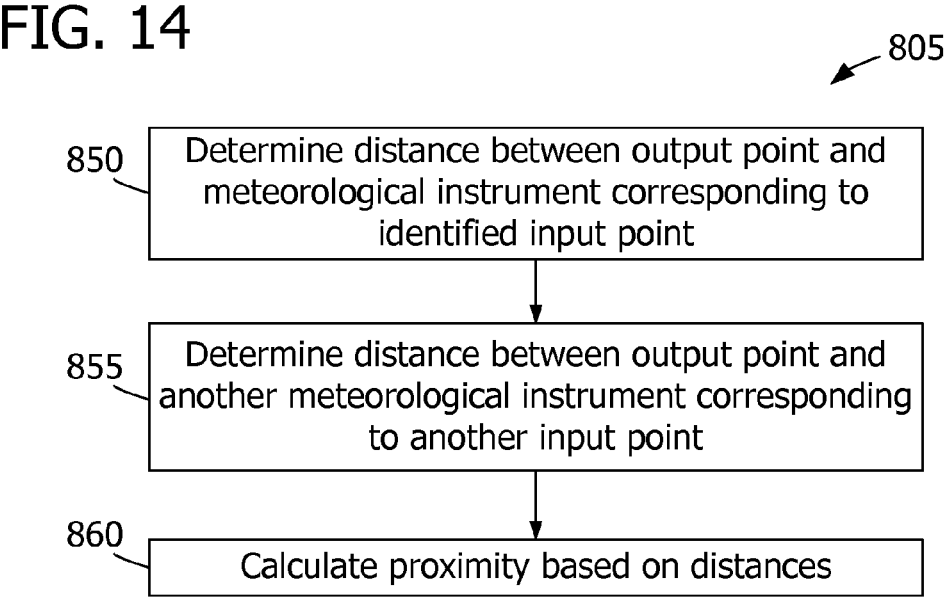
FIG. 14 is a flowchart of an exemplary method for determining a proximity of an output point to a meteorological instrument corresponding to an input point.

In one embodiment, shown in FIG. 13, calculating 730 a wind condition for an output point includes identifying 800 a plurality of input points having a geographic position substantially equal to the geographic position of the output point. A weight is assigned 810 to the wind condition associated with each identified input point based on a proximity of the output point to a meteorological instrument corresponding to the identified input point. The wind conditions of the identified input points are combined 820 based on the assigned weights.

Method 700 may also include, prior to assigning 810 a weight to the wind condition, determining 805 the proximity of the output point to the meteorological instrument. In an exemplary embodiment, the proximity is determined 805 as shown by the flowchart in FIG. 4. A first distance is determined 850 between the output point and the meteorological instrument corresponding to the identified input point. A second distance is determined 855 between the output point and a meteorological instrument corresponding to another identified input point of the identified plurality of input points. A proximity is calculated 860 based on the first distance and the second distance. For example, an inverse distance weighting function, such as set forth in Equations 1-3 above, may be applied to the first distance and the second distance to calculate 860 the proximity.

Figure 15:
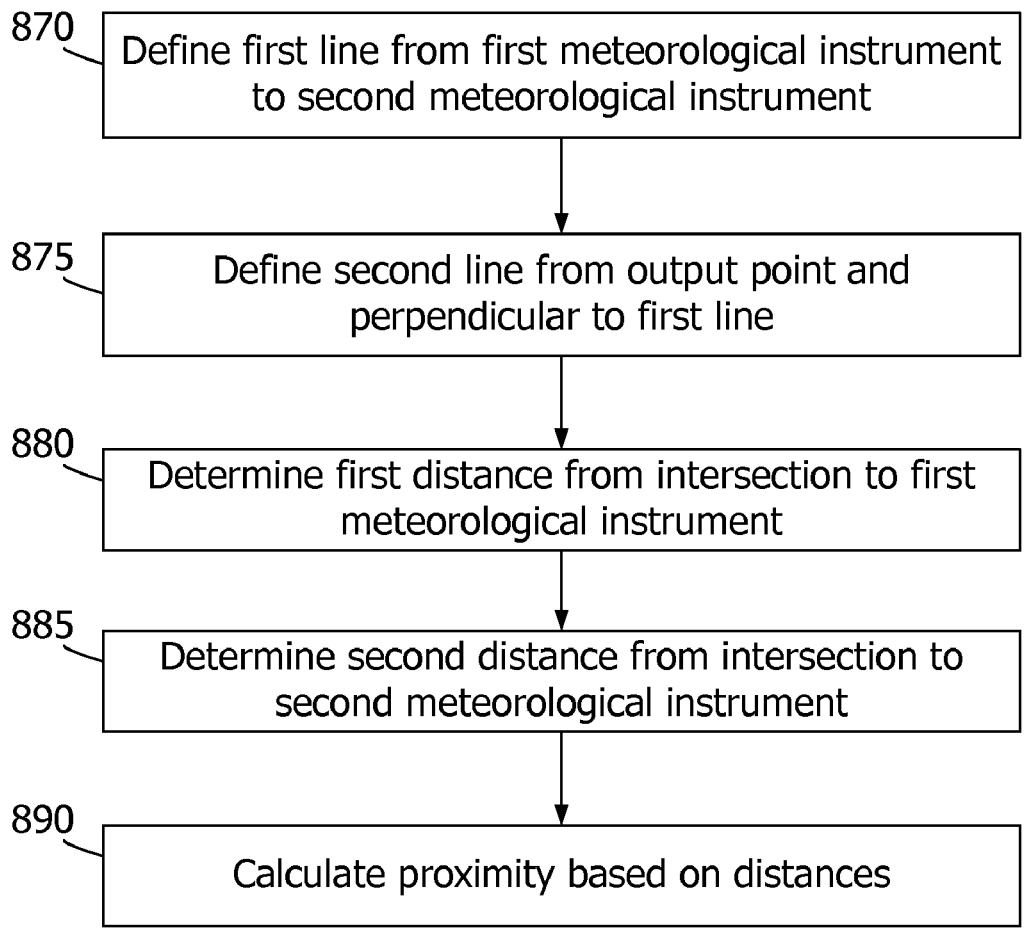
FIG. 15 is a flowchart of another exemplary method for determining a proximity of an output point to a meteorological instrument corresponding to an input point.

In another exemplary embodiment, the proximity is determined 805 as shown by the flowchart in FIG. 15. As shown in FIG. 15, this meteorological instrument is referred to as a first meteorological instrument. A first line is defined 870, extending from the first meteorological instrument to a second meteorological instrument corresponding to another identified input point of the identified plurality of input points. A second line is defined 875, extending from the output point and perpendicular to the first line to create an intersection point of the first line and the second line. A first distance between the intersection point and the first meteorological instrument is determined 880. A second distance between the intersection point and the second meteorological instrument is determined 885. A proximity is calculated 890 based on the first distance and the second distance. Such an embodiment facilitates weighting wind conditions based on a relative projected distance from a meteorological instrument.

In some embodiments, an input wind resource grid and the output wind resource grid define different spatial resolutions and/or are offset from each other. Referring again to FIG. 12, method 700 may include transposing 722 one or more input wind resource grids to the spatial resolution defined by the output wind resource grid. For example, an interpolated wind condition may be calculated based on wind conditions associated with a plurality of input points proximate to the output point.

Figure 16:
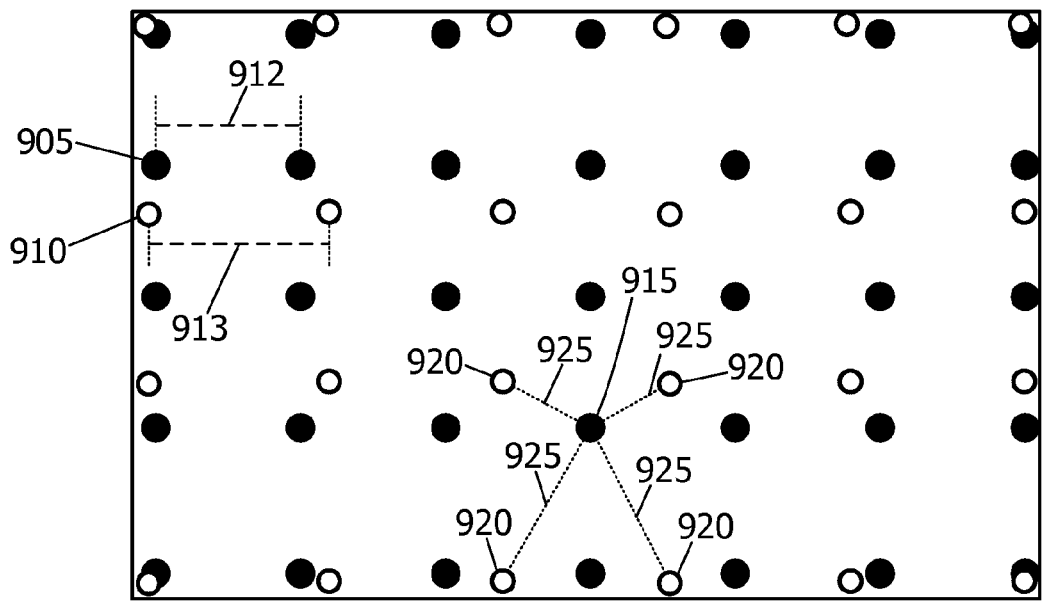
FIG. 16 shows input points of an input wind resource grid and output points of an output wind resource grid defining different spatial resolutions.

FIG. 16 shows output points 905 of an output wind resource grid and input points 910 of an input wind resource grid defining different spatial resolutions. As shown in FIG. 16, output points 905 are spaced at a first distance 912. Input points 910 are spaced at a second distance 913, which is larger than first distance 912. Because first distance 912 is smaller than second distance 913, the spatial resolution defined by output points 905 is higher than the spatial resolution defined by input points 910.

In an exemplary embodiment, to transpose the input wind resource grid to the spatial resolution of the output wind resource grid, new input points are generated, with each new input point having a position substantially equal to the position of an output point 905. In an exemplary embodiment, an output point 915 is identified. A plurality of input points 920 proximate to identified output point 915 is also identified. Each of identified input points 920 is associated with a wind condition. A wind condition at the position of identified output point 915 is interpolated from the wind conditions associated with identified input points 920.

In some embodiments, each of identified input points 920 is positioned at a distance 925 from identified output point 915. For a new input point with a position substantially equal to the position of identified output point 915, a wind condition is calculated based on the wind conditions associated with identified input points 920 and distances 925. Transposing 722 an input wind resource grid to the spatial resolution defined by the output wind resource grid facilitates easily identifying 800 a plurality of input points having a geographic position substantially equal to the geographic position of the output point.

In some embodiments, a wind condition is calculated 730 based on one or more areas of influence, such as described above in reference to FIGS. 9-11. For example, method 700 may include defining 724 a first area of influence for a first input wind resource grid of the plurality of input wind resource grids. A wind condition for an output point is calculated 730 based at least in part on the wind condition of an input point of the first input wind resource grid only if the output point is within the first area of influence. If the output point is outside the first area of influence, the wind condition of the input point is disregarded.

In one embodiment, a second area of influence for a second input wind resource grid of the plurality of input wind resource grids is defined 726. For an output point within both the first area of influence and the second area of influence, a wind condition is calculated 730 based at least in part on a first wind condition of a first input point of the first input wind resource grid and a second wind condition of a second input point of the second input wind resource grid. If the output point is within only the first area of influence, the wind condition of the input point of the second input wind resource grid is disregarded. Similarly, if the output point is within only the second area of influence, the wind condition of the input point of the first input wind resource grid is disregarded.

Figure 17:
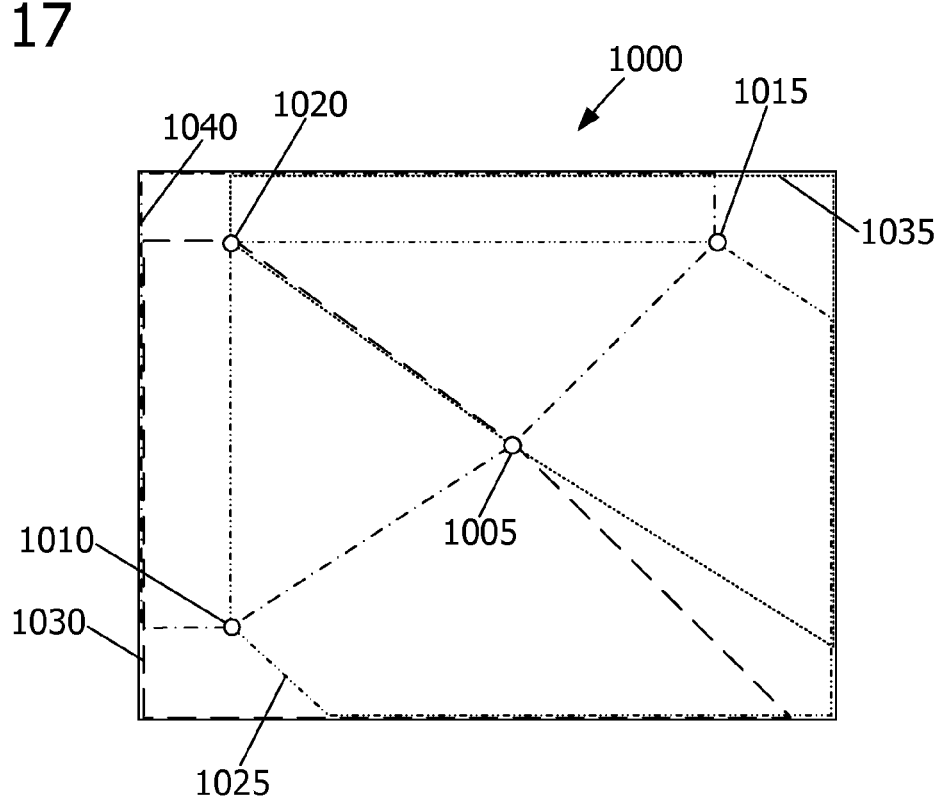
FIG. 17 shows an output wind resource grid including four meteorological instruments, each of which is associated with an area of influence.

FIGS. 17-21 show the creation of an output wind resource grid based on a plurality of exemplary input wind resource grids. FIG. 17 shows an output wind resource grid 1000 including a first meteorological instrument 1005, a second meteorological instrument 1010, a third meteorological instrument 1015, and a fourth meteorological instrument 1020, which are associated with a first area of influence 1025, a second area of influence 1030, a third area of influence 1035, and a fourth area of influence 1040, respectively.

Figure 18:
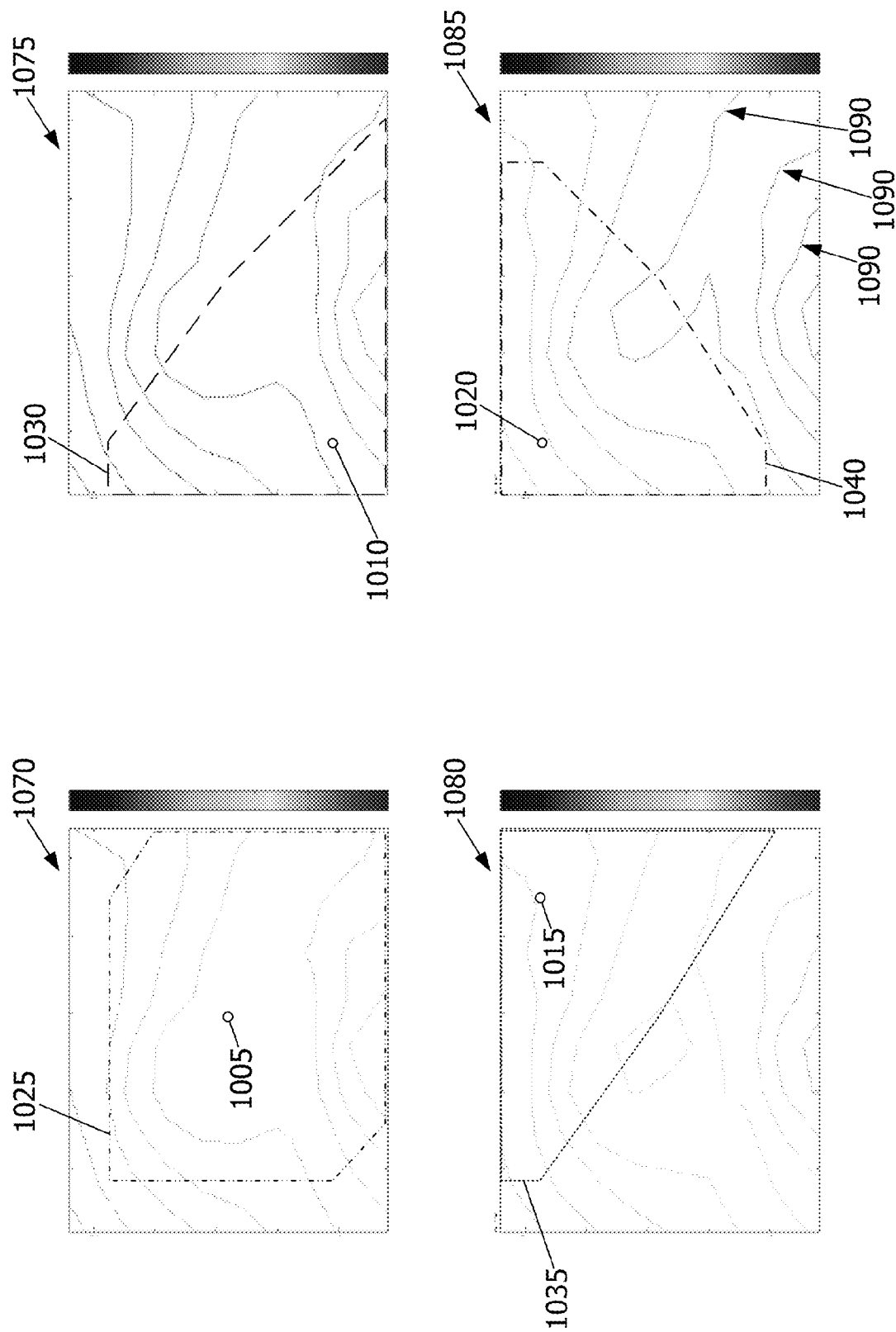
FIG. 18 shows input wind resource grids and areas of influence corresponding to the output wind resource grid shown in FIG. 17.

FIG. 18 shows input wind resource grids and areas of influence corresponding to output wind resource grid 1000. A first input wind resource grid 1070 corresponds to first meteorological instrument 1005 and first area of influence 1025. A second input wind resource grid 1075 corresponds to second meteorological instrument 1010 and second area of influence 1030. A third input wind resource grid 1080 corresponds to third meteorological instrument 1015 and third area of influence 1035. A fourth input wind resource grid 1085 corresponds to fourth meteorological instrument 1020 and fourth area of influence 1040. Wind conditions, such as wind speed, may be displayed as a plurality of contour lines 1090, as shown in fourth input wind resource grid 1085.

Figure 19:
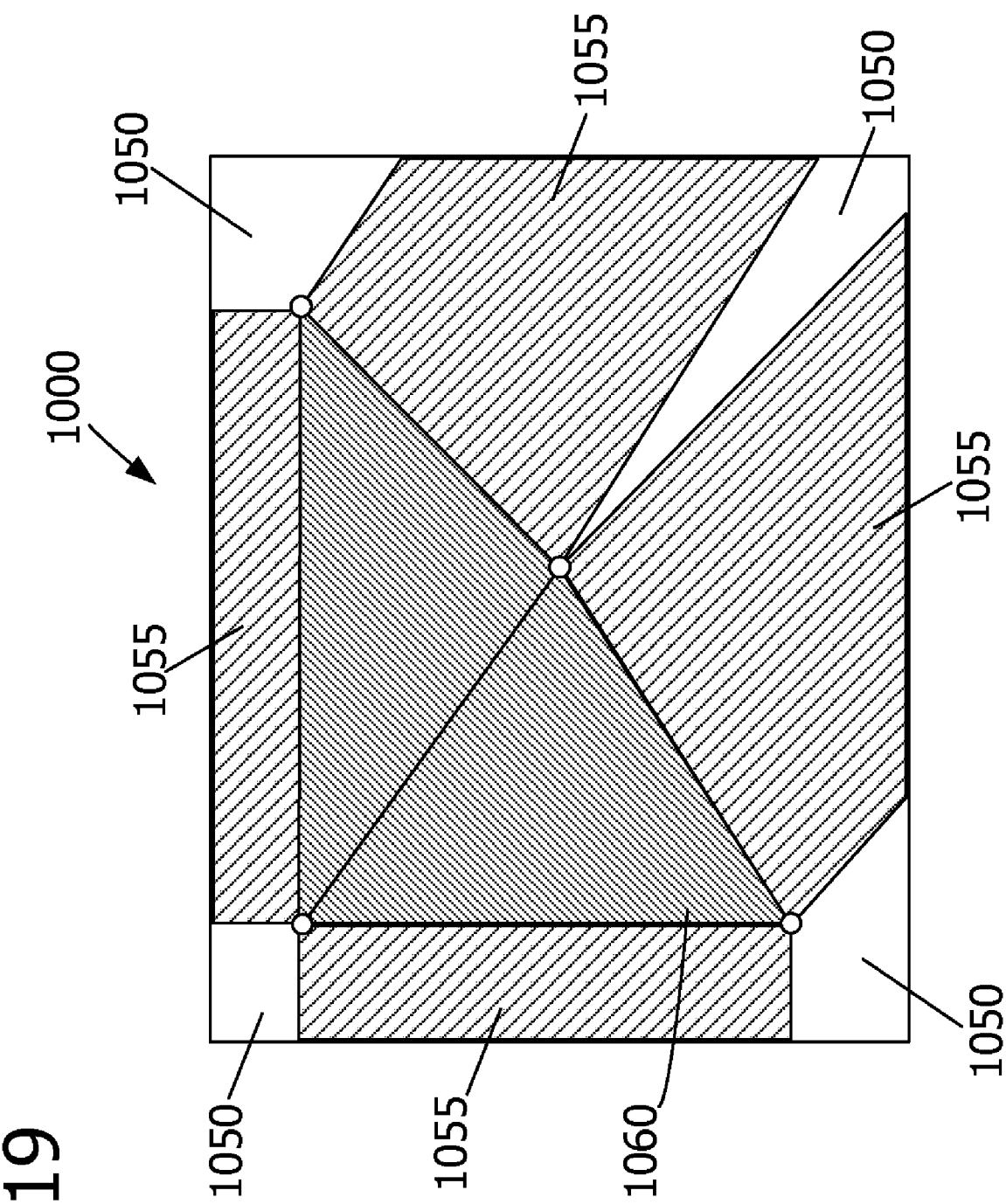
FIG. 19 shows overlapping portions of areas of influence in the output wind resource grid shown in FIG. 17.

FIG. 19 shows overlapping portions of first area of influence 1025, second area of influence 1030, third area of influence 1035, and fourth area of influence 1040. One-instrument areas 1050 are included in an area of influence for one meteorological instrument. Two-instrument areas 1055 are included in areas of influence for two meteorological instruments. A three-instrument area 1060 is included in areas of influence for three meteorological instruments.

Figure 20:
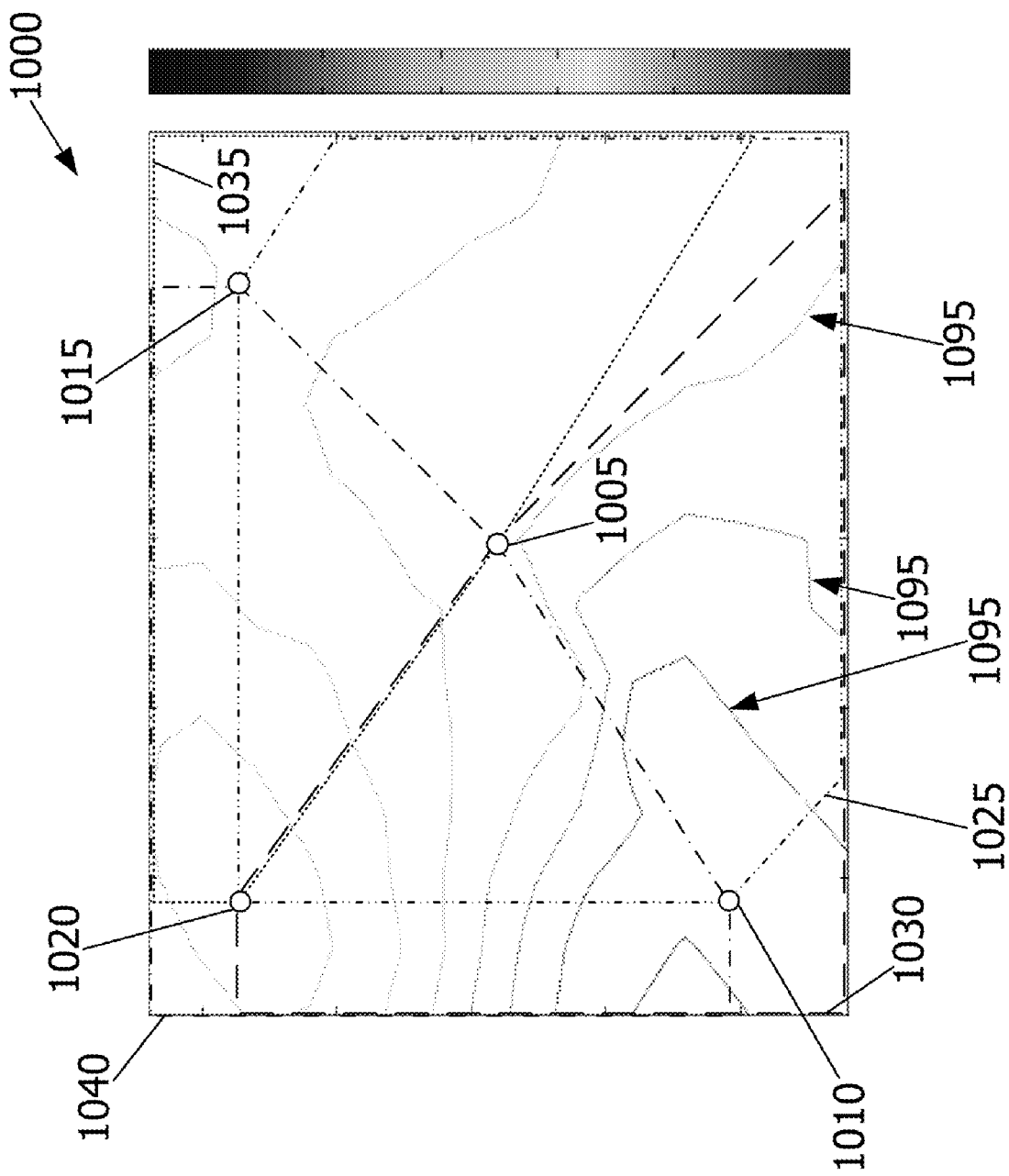
FIG. 20 shows the output wind resource grid shown in FIG. 17 with wind conditions calculated based on wind conditions of the input wind resource grids shown in FIG. 18.

FIG. 20 shows output wind resource grid 1000 with wind conditions calculated based on wind conditions of first input wind resource grid 1070, second input wind resource grid 1075, third input wind resource grid 1080, and fourth input wind resource grid 1085. For example, wind conditions for output wind resource grid 1000 may be calculated using inverse distance weighting, as set forth in Equations 1-5. First meteorological instrument 1005 and first area of influence 1025, second meteorological instrument 1010 and second area of influence 1030, third meteorological instrument 1015 and third area of influence 1035, and fourth meteorological instrument 1020 and fourth area of influence 1040 are also shown in FIG. 20. Wind conditions are displayed as a plurality of contour lines 1095.

Figure 21:
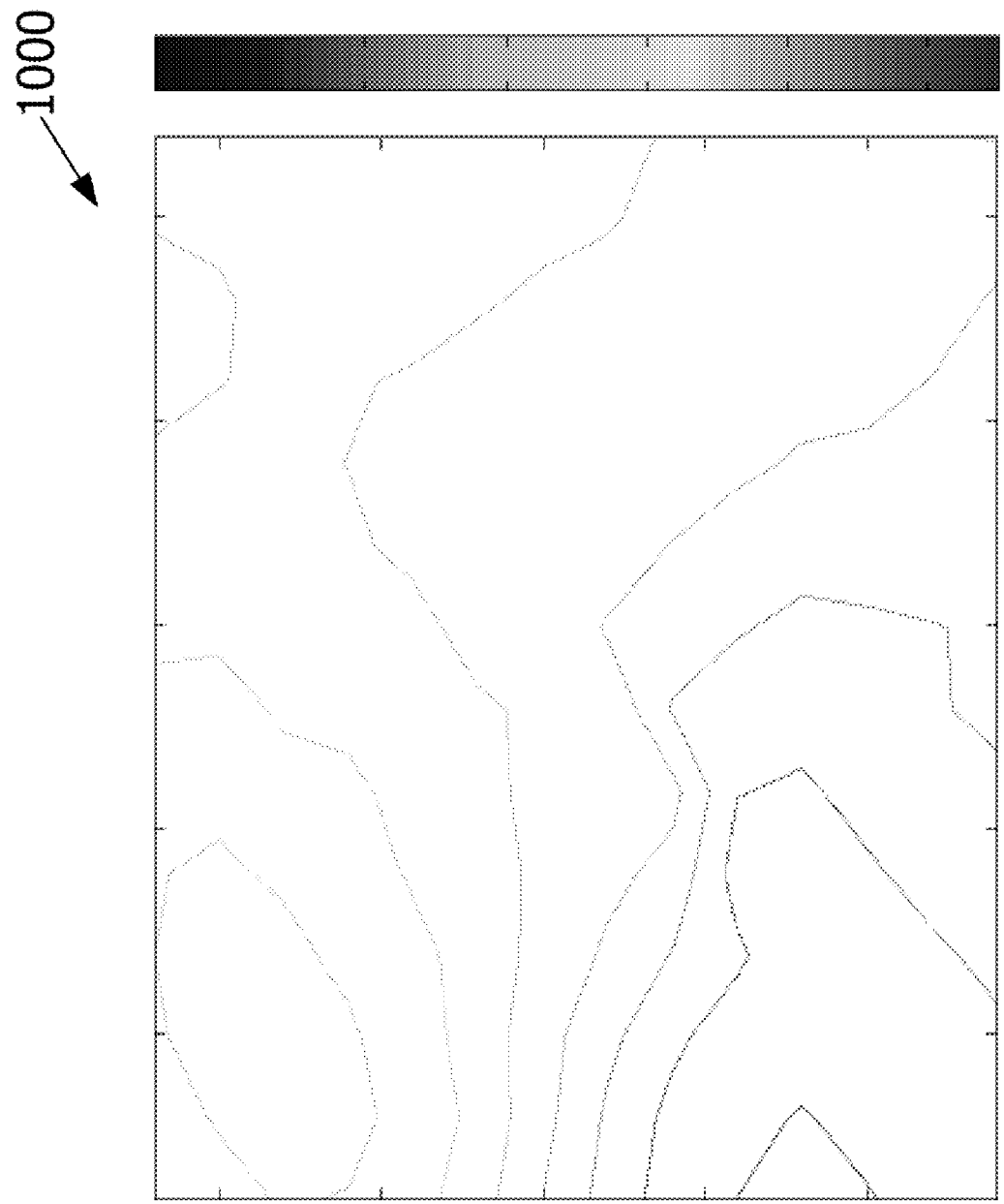
FIG. 21 shows the output wind resource grid shown in FIG. 20 without indicators for meteorological instruments and areas of influence.

FIG. 21 shows output wind resource grid 1000 without indicators for meteorological instruments and areas of influence. In an exemplary embodiment, output wind resource grid 1000, as shown in FIG. 21, is displayed to a user, such as user 220. Providing output wind resource grid 1000 to a user facilitates convenient evaluation of wind resources across a site based on input from multiple meteorological instruments.

The methods described herein may be encoded as executable instructions embodied in a computer readable medium, including a memory area of a computing device. Such instructions, when executed by a processor, cause the processor to perform at least a portion of the methods described herein.

Exemplary embodiments of a wind resource grid merging system are described above in detail. The merging system, wind turbine, and included assemblies are not limited to the specific embodiments described herein, but rather each component may be utilized independently and separately from other components described herein. Furthermore, while exemplary distance weighting equations are provided herein, any equations suitable for determining a weight based on distance between a point and one or more meteorological instruments may be used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for determining wind conditions within a geographic area, the device comprising:
    a memory area configured to store a plurality of input wind resource grids including a plurality of input points, each input point of the plurality of input points associated with a wind condition, a first geographic position, and a meteorological instrument having a second geographic position, the first geographic position of at least one input point being within the geographic area; and,
    a processor coupled to the memory area and programmed to:
        define an output wind resource grid having a plurality of output points associated with a third geographic position within the geographic area; and,
        for each output point of the plurality of output points of the output wind resource grid, determine a wind condition based at least in part on:
            a wind condition associated with at least one corresponding input point; and,
            a distance between the third geographic position of the output point and the second geographic position of a meteorological instrument associated with the at least one corresponding input point.

2. A device in accordance with claim 1, wherein the processor is further programmed to determine a wind condition for an output point of the plurality of output points by:
    identifying a plurality of input points associated with a first geographic position substantially equal to the third geographic position associated with the output point;
    for each input point of the plurality of identified input points, assigning a weight to the wind condition associated with the input point based on a proximity of the output point to the meteorological instrument associated with the corresponding input point; and,
    combining the wind conditions of the plurality of identified input points based on the assigned weights.

3. A device in accordance with claim 2, wherein the processor is further programmed to determine the proximity of the output point to the meteorological instrument associated with each input point of the identified plurality of input points by:
    determining a first distance between the output point and a meteorological instrument associated a first input point of the identified plurality of input points;
    determining a second distance between the output point and a meteorological instrument associated with a second input point of the identified plurality of input points; and,
    calculating a proximity based on the first distance and the second distance.

4. A device in accordance with claim 3, wherein the processor is further programmed to calculate a proximity based on the first distance and the second distance by applying a nonlinear inverse distance weighting function to the first distance and the second distance.

5. A device in accordance with claim 2, wherein the processor is further programmed to determine the proximity of the output point to the meteorological instrument associated with each input point of the identified plurality of input points by:
    determining a first distance between the output point and a meteorological instrument associated with a first input point of the identified plurality of input points;
    determining a second distance between the output point and a meteorological instrument associated with a second input point of the identified plurality of input points;
    determining a third distance between the output point and a meteorological instrument associated with a third input point of the identified plurality of input points; and,
    calculating a proximity based on the first distance, the second distance, and the third distance.

6. A device in accordance with claim 5, wherein the processor is further programmed to calculate a proximity based on the first distance, the second distance, and the third distance by applying a nonlinear inverse distance weighting function to the first distance, the second distance, and the third distance.

7. A device in accordance with claim 1, further comprising a presentation device coupled to the processor and configured to display the output wind resource grid.

8. A device in accordance with claim 1, further comprising an input device configured to receive a selection of an area of influence for a first input wind resource grid of the plurality of input wind resource grids, the area of influence comprising a portion of the geographic area, wherein the processor is further programmed to determine wind conditions based on wind conditions corresponding to the first input wind resource grid only for input points within the area of influence.

9. A device in accordance with claim 8, wherein the input device is further configured to receive a user-defined weight corresponding to the area of influence, wherein the processor is further programmed to determine a wind condition for an output point within the area of influence based further on the user-defined weight.

10. A device in accordance with claim 8, wherein the input device is configured to receive a selection of an area of influence by receiving a selection of a polygon.

11. A method for determining wind conditions within a geographic area, the method comprising:
    acquiring a plurality of input wind resource grids including a plurality of input points associated with a first geographic position and a wind condition, the first geographic position of at least one of the input points being within the geographic area;
    defining an output wind resource grid having a plurality of output points associated with a second geographic position within the geographic area; and,
    for each output point of the plurality of output points of the output wind resource grid, calculating, by a processor, a wind condition based at least in part on a plurality of wind conditions associated with at least some of the acquired plurality of input points.

12. A method in accordance with claim 11, wherein calculating a wind condition comprises calculating at least one of a wind speed and a frequency of occurrence for at least one wind direction.

13. A method in accordance with claim 11, wherein calculating a wind condition comprises calculating at least one of a power density and a power production.

14. A method in accordance with claim 11, wherein calculating a wind condition for an output point comprises:

identifying a plurality of input points having a first geographic position substantially equal to the second geographic position of the output point;

assigning a weight to the wind condition associated with each identified input point of the identified plurality of input points based on a proximity of the output point to a meteorological instrument corresponding to the identified input point; and, combining the wind conditions of the identified plurality of input points based on the assigned weights.

15. A method in accordance with claim 14, wherein calculating a wind condition for each output point further comprises determining the proximity of the output point to the meteorological instrument corresponding to the identified input point by:

determining a first distance between the output point and the meteorological instrument corresponding to the identified input point;

determining a second distance between the output point and a meteorological instrument corresponding to another identified input point of the identified plurality of input points; and, calculating a proximity based on the first distance and the second distance.

16. A method in accordance with claim 15, wherein calculating a proximity based on the first distance and the second distance comprises applying an inverse distance weighting function to the first distance and the second distance.

17. A method in accordance with claim 14, wherein the meteorological instrument corresponding to the identified input point is a first meteorological instrument, and calculating a wind condition for an output point further comprises determining the proximity of the output point to the first meteorological instrument by:

defining a first line extending from the first meteorological instrument to a second meteorological instrument corresponding to another identified input point of the identified plurality of input points;

defining a second line extending from the output point and perpendicular to the first line to create an intersection point of the first line and the second line;

determining a first distance between the intersection point and the first meteorological instrument;

determining a second distance between the intersection point and the second meteorological instrument; and, calculating a proximity based on the first distance and the second distance.

18. A method in accordance with claim 11, wherein the output wind resource grid defines a first spatial resolution, wherein one input wind resource grid of the plurality of input wind resource grids defines a second spatial resolution different from the first spatial resolution, the method further comprising transposing the one input wind resource grid to the first spatial resolution.

19. A method in accordance with claim 11, further comprising:

defining a first area of influence for a first input wind resource grid of the plurality of input wind resource grids, wherein calculating a wind condition for an output point comprises calculating a wind condition based at least in part on the wind condition of an input point of the plurality of input points of the first input wind resource grid only if the output point is within the first area of influence.

20. A method in accordance with claim 19, further comprising:

defining a second area of influence for a second input wind resource grid of the plurality of input wind resource grids, wherein calculating a wind condition for an output point within the first area of influence and the second area of influence comprises calculating a wind condition based at least in part on a first wind condition of a first input point of the plurality of input points of the first input wind resource grid and a second wind condition of a second input point of the plurality of input points of the second input wind resource grid.

* * * * *